US011533334B2

(12) United States Patent
Shapira et al.

(10) Patent No.: US 11,533,334 B2
(45) Date of Patent: *Dec. 20, 2022

(54) INFRASTRUCTURE DISTRIBUTED DENIAL OF SERVICE PROTECTION

(71) Applicant: Imperva, Inc., Redwood Shores, CA (US)

(72) Inventors: Dvir Shapira, Sunnyvale, CA (US); Ehud Cohen, Kfar Saba (IL); Tomer Bronshtein, Ashdod (IL); Eyal Leshem, Jerusalem (IL); Alon Ludmer, Kfar Saba (IL)

(73) Assignee: Imperva, Inc., Redwood Shores, CA (US)

( * ) Notice: Subject to any disclaimer, the term of this patent is extended or adjusted under 35 U.S.C. 154(b) by 135 days.

This patent is subject to a terminal disclaimer.

(21) Appl. No.: 16/749,883

(22) Filed: Jan. 22, 2020

(65) Prior Publication Data

US 2020/0162508 A1 May 21, 2020

Related U.S. Application Data

(63) Continuation of application No. 15/628,620, filed on Jun. 20, 2017, now Pat. No. 10,574,691.

(Continued)

(51) Int. Cl.
*H04L 29/06* (2006.01)
*H04L 9/40* (2022.01)
*H04L 45/12* (2022.01)

(52) U.S. Cl.
CPC ........ *H04L 63/1458* (2013.01); *H04L 63/029* (2013.01); *H04L 63/0236* (2013.01);
(Continued)

(58) Field of Classification Search
CPC ............ H04L 63/1458; H04L 63/1408; H04L 63/0236; H04L 63/029; H04L 63/10
See application file for complete search history.

(56) References Cited

U.S. PATENT DOCUMENTS 9,350,706 B1* 5/2016 Smith ..................... H04L 63/10
2002/0035698 A1 3/2002 Malan et al.
(Continued)

OTHER PUBLICATIONS

Agarwal, S. et al., "DDoS mitigation via Regional Cleaning Centers," Sprint ATL Research Report RR04-ATL-013177, Jan. 2004, eleven pages.

(Continued)

*Primary Examiner* — Noura Zoubair
(74) *Attorney, Agent, or Firm* — Womble Bond Dickinson (US) LLP

(57) ABSTRACT

A method of providing infrastructure protection for a network that includes IP addresses as low as a single IP address. An end user sends traffic to an IP address of a projected server publicly available as an anycast address, and sends traffic to the protected network. The traffic is routed via one of several scrubbing centers using the public IP address as anycast address, and the scrubbing center provides infrastructure protection by scanning and filtering the incoming traffic for illegitimate data. After filtering, the legitimate traffic is encapsulated, e.g., via including virtual GRE tunnel information that includes a secret IP address known only to the scrubbing center and the protected server that receives the network traffic. The protected server decapsulates the network packet and responds back to the end user via the scrubbing network.

18 Claims, 5 Drawing Sheets

Related U.S. Application Data

(60) Provisional application No. 62/353,021, filed on Jun. 21, 2016.

(52) U.S. Cl.
CPC .......... *H04L 63/10* (2013.01); *H04L 63/1408* (2013.01); *H04L 45/12* (2013.01); *H04L 63/1441* (2013.01)

(56) References Cited

U.S. PATENT DOCUMENTS

| | | |
|---|---|---|
| 2012/0287935 A1 | 11/2012 | Swallow et al. |
| 2013/0007870 A1 | 1/2013 | Devarajan et al. |
| 2015/0052599 A1 | 2/2015 | Champagne et al. |
| 2015/0188949 A1* | 7/2015 | Mahaffey ............. H04W 12/37 726/1 |
| 2015/0341428 A1* | 11/2015 | Chauhan ............. H04L 67/42 709/203 |
| 2016/0080411 A1 | 3/2016 | Jain |

OTHER PUBLICATIONS

Huici, F. et al., "An Edge-to-Edge Filtering Architecture Against DoS," ACM SIGCOMM Computer Communication Review, Apr. 2007, pp. 41-50, vol. 37, No. 2.

Kiesel, S. et al., Port Control Protocol (PCP) Anycast Addresses, Jan. 2016, nine pages. [ Retrieved from <https://tools.ietf.org/html/rfc7723.>.

Mirkovic, J. et al., "A taxonomy of DDoS Attack and DDoS Defense Mechanisms," in ACM SIGCOMM Computer Communication Review, May 2001, Sixteen Pages.

PCT International Search Report and Written Opinion. PCT Application No. PCT/US2017038365, dated Sep. 6, 2017, fifteen pages.

* cited by examiner

INFRASTRUCTURE DISTRIBUTED DENIAL OF SERVICE PROTECTION

RELATED APPLICATIONS

This application is a continuation of U.S. application Ser. No. 15/628,620, filed Jun. 20, 2017, which claims the benefit of U.S. Provisional Application No. 62/353,021, filed on Jun. 21, 2016, which are incorporated herein by reference in its entirety for all purposes.

FIELD OF DISCLOSURE

This disclosure relates to security in a computing system, and in particular to Distributed Denial of Service (DDoS) protection for a network infrastructure.

BACKGROUND

Infrastructure protection services allow organizations to tunnel all ingress traffic (traffic from the Internet to the origin network) through a scrubbing centers network. One or more edge routers of an organization's network use the Border Gateway Protocol (BGP) to announce subnets and IP ranges to be advertised by the scrubbing centers, thus forcing all incoming traffic via the Internet routes to point at the scrubbing centers network instead of pointing at the organizations data center that forms the network infrastructure.

Infrastructure protection services use Generic Routing Encapsulation (GRE) tunneling to forward the incoming traffic to the organization's network after the traffic has been scrubbed from any DDoS attack. The incoming/outgoing Internet traffic for an organization can be routed through scrubbing centers in two ways. The first is by an organization's edge router announcing that the scrubbing centers' autonomous system (AS) is the owner of the organization's IP range. The second is done by the scrubbing centers edge routers announcing that they are the owner of the organization's IP range. Both of these methods lead to the customer traffic being routed through the scrubbing centers and scrubbed prior to reaching the organization's data center.

In order to use the infrastructure protection service, an organization must own a minimum number of IP addresses (for example, 256 IP addresses). Thus, an organization with IP addresses less than the minimum number required for traditional infrastructure protection services may not be able to avail the service, and thus may be prone to DDoS attacks. Additionally, existing systems require that each protected network manually establish a dedicated GRE tunnel with each of the scrubbing centers. This is very difficult for smaller organizations that lack the proper network administration skills.

Prior solutions have been sub-optimal, including: On-premises solutions, which are rapidly losing their advantage as attacks get larger, and bots get more human-like. It makes more sense to mount a community defense, in the cloud. However, cloud-based solutions are better equipped to handle the changing attack environment, but require that you protect an entire Class C network. ISP clean pipe solutions lack capacity to handle just average size attacks, especially when it comes to packet-based attacks. Security isn't always a core capability of an ISP and they often don't have the security expertise of a dedicated DDoS mitigation provider. Proxy-based solutions completely hide the client IP, which breaks many applications and completely bypasses the firewall. Hybrid solutions are transient, only kicking in when a sustained attack occurs.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
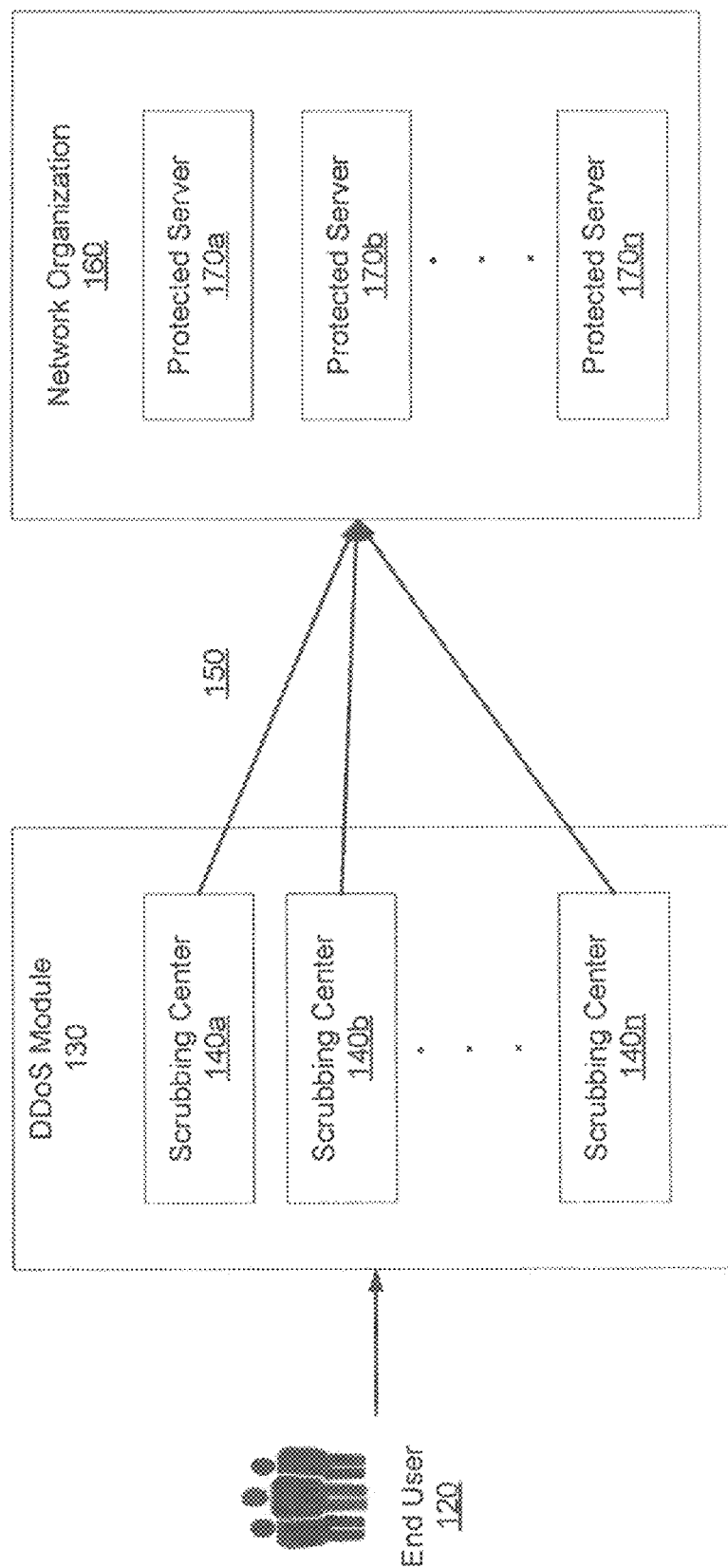
FIG. 1 illustrates an environment for a DDoS protection module, according to one embodiment.

FIG. 1 is a block diagram that illustrates an environment for a DDoS protection module 130, according to one embodiment. The environment includes one or more end users 120, a DDoS module 130 with one or more scrubbing centers 140 and a network organization 160 that includes one or more protected servers 170. The scrubbing centers 140 and network organization 160 may interface, e.g., via a virtual GRE tunnel 150. In alternative configurations, different and/or additional components may be included in the system environment.

The environment includes one or more end users 120. The end users 120 are one or more computing devices capable of receiving user input as well as transmitting and/or receiving data to and from an organization's network infrastructure via a network. In one embodiment the end user 120 may be an electronic device such as a smartphone, a tablet computer, a desktop computer, or a laptop computer. Alternatively, an electronic device may be a device having computer functionality that accesses a set of mobile applications. In another embodiment, the end user 120 may a potential malicious DDoS attacker, i.e. and individual trying to hack the organization's network infrastructure or an electronic device program that tries to hack the network infrastructure.

The network over which the end user 120 communicates may comprise any combination of local area and/or wide area networks, using both wired and/or wireless communication systems. In one embodiment, the network uses standard communications technologies and/or protocols. For example, the network includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network may be represented using any suitable format, such as hypertext markup language (HTML) or extensible markup language (XML). In some embodiments, all or some of the communication links of the network may be encrypted using any suitable technique or techniques.

The DDoS protection module 130 provides infrastructure protection service for a network infrastructure that has IP addresses as low as a single IP address. The DDoS protection module 130 may be a point-of-presence (POP) that includes scrubbing centers 140, routers, switches, routing servers and other such components. A scrubbing server's web protection is based on a network of secure reverse proxies deployed on a globally distributed CDN. Web traffic that is routed through the scrubbing centers 140 network is terminated by those proxies, allowing scrubbing centers 140 to inspect each and every request to the website and identify and block any malicious activity. Organizations using web protection update their domain DNS to point to a unique hostname (CNAME) provided by the scrubbing centers 140 (e.g., mysite.incapdns.net).

The technologies utilized for providing the infrastructure protection are enabled by one or more scrubbing centers 140. The DDoS module 130 may employ or multiple scrubbing centers 140*a-n*. The scrubbing centers 140 run innovative algorithms and software technology on standard off-the-shelf hardware. A scrubbing server appliance in the scrubbing center 140 performs all Layer 3 and Layer 4 DDoS scrubbing and then passes all legitimate traffic back to an organization's network infrastructure 160, e.g., using a routing server. The scrubbing server is a powerful network layer processing module that is capable of processing incoming data packets at a very high speed—much faster than the target machines within the organization's network 160 that run target applications. The scrubbing center 140 is considered "nearest" the end user or protected server if it is geographically closest, lowest cost, healthiest, with the least congested route, and/or any other distance measure. The technology embedded in the routing server has unique routing capabilities that enable GRE tunnel 150 and packet processing, as described herein.

The organization's network infrastructure 160 includes one or more protected servers 170. The protected server 170 encapsulates an outgoing network packet with header information including the anycast public IP address, and sends it to the scrubbing center nearest the protected server via the anycast public IP address.

The generic routing encapsulation tunnel information comprises use of a single, virtual generic routing encapsulation tunnel 150 for the plurality of scrubbing centers 140. Likewise, a single generic routing encapsulation tunnel 150 can serve plurality of protected servers in the network organization 160.

The scrubbing centers 140 ensure that any scrubbing server 140 can handle any ingress packet and any egress packet. Scrubbing centers 140 "spoof" the source IP address from which they send the packets via the virtual GRE tunnel in the ingress section of the packet, such that an anycast address for the scrubbing servers is used as the source of the traffic form the perspective of the protected server. In short, all the scrubbing centers use the same origin IP address when sending packets to the protected server 170. This is a unique technique that causes all the scrubbing centers 140 to appear to be the same to the protected server 170 of an organization's network infrastructure 160. The protected server 170 sends the egress packets to the anycasting scrubbing centers 140 and is oblivious to which scrubbing center 140 actually receives it. The spoofing mechanism provides transparency to the protected server 170. From the protected server 170 side, it appears like it is communicating with a single scrubbing center 140.

Figure 2:
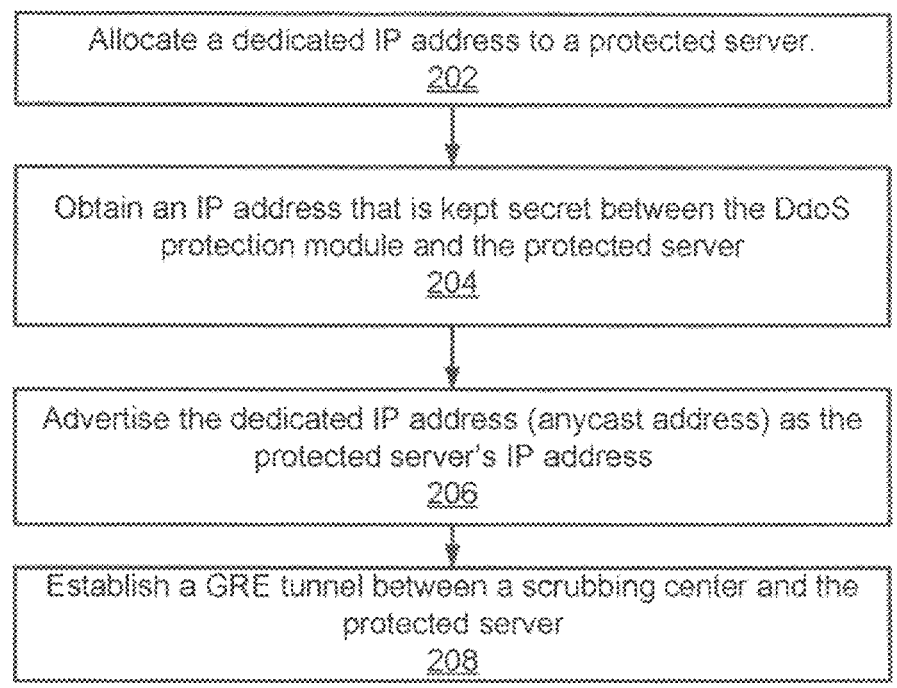
FIG. 2 illustrates a flow of events when an organization's network onboards the infrastructure protection services via the DDoS protection module, according to one embodiment.

FIG. 2 illustrates a flow of events when an organization's network 160 onboards the infrastructure protection services via the DDoS protection module 140, according to one embodiment. The DDoS protection module 140 owns a range of IP addresses. For each protected server of an organization's network infrastructure 160, the DDoS protection module 140 allocates 202 a dedicated IP address from within that range. The protected server further obtains 204 an IP address from an Internet Service Provider (ISP) that is kept secret between the DDoS protection module 140 and the protected server. The protected server may be one of a plurality of protected servers in the network organization.

The protected server advertises 206 the dedicated IP address as its address to the world using domain name system (DNS). Thus an end user 120 that identifies the protected server by NAME would use the dedicated IP address for communicating with the protected server. The dedicated IP address is advertised, as an anycast address. An anycast address includes addressing routes datagrams to a single member of a group of potential receivers that are all identified by the same destination address. This is a one-to-nearest association. Thus anyone trying to access the protected network would end up going through the nearest scrubbing center. The scrubbing center 140 is considered "nearest" the end user or protected server if it is geographically closest, lowest cost, healthiest, with the least congested route, and/or any other distance measure.

Further in the onboarding process, a "virtual GRE tunnel" is established 208 between the protected server of the organization's network 160 and the scrubbing centers network within the DDoS protection module 140. The "virtual GRE tunnel" is achieved by the fact the that the IP address of the GRE tunnel in scrubbing centers side is published as an anycast IP which means that all of scrubbing center would wide publish it as their own. This leads to the fact that the closest scrubbing center to the packet to/from a protected server would service it.

Figure 5:
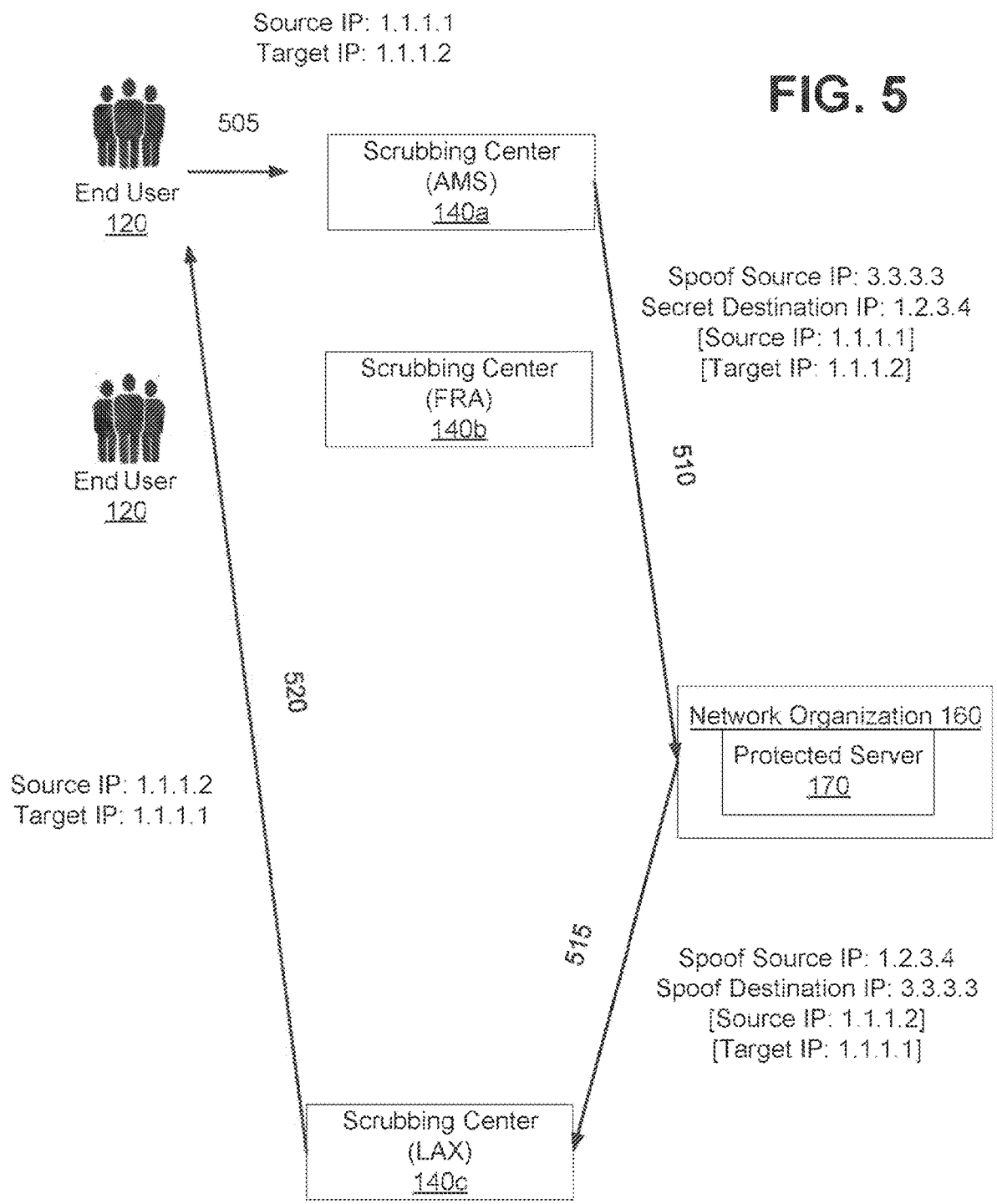
FIG. 5 illustrates an example of incoming and outgoing traffic from and to an end user and a protected server, according to one embodiment.

The GRE tunnel connected between scrubbing centers and the protected server is defined by the following three IP addresses. First, a scrubbing center public IP address. This is a single dedicated IP address, anycasted globally, on the scrubbing centers network to which the GRE tunnel is connected. The end user 120 is provided this address as the public IP address of the protected server 170 it is trying to reach. In the example of FIG. 5, this is IP address 1.1.1.2.

Second, the protected server's routable, secret IP Address. This is the protected network's actual IP address, which is kept secret between the scrubbing center 140 and the protected network 170. In the example of FIG. 5, this is IP address 1.2.3.4. Third, a scrubbing center protect IP address is used as a spoofed source address from the protected server's perspective (in the example of FIG. 5, 3.3.3.3). This is a single dedicated IP address, anycasted globally, on the scrubbing centers network which serves as the new protected origin IP address.

After the packet is received by the scrubbing center 140 from an end user 120, it will be scanned and filtered and then a GRE header will be added, routing it to the protected server 170. The protected server 170 will receive the packet, decapsulate its GRE header, and process it. When sending data back the end user 120, a GRE header routing the traffic back to the scrubbing center 140 will be added by the protected server 170. The routing server in the scrubbing center 140 which will receive the packet will decapsulate its GRE header, and route the traffic back to the end user 120. This process is described in greater detail in conjunction with FIG. 4.

Scrubbing Center Anycasting

The scrubbing centers 140 perform two types of anycasting to ensure redundancy and packet loss prevention. Anycasting an IP address includes associating addressing routes datagrams to a single member of a group of potential receivers that are all identified by the same destination address. This is a one-to-nearest association. A scrubbing center 140 is considered "nearest" the end user or protected server if it is geographically closest, lowest cost, healthiest, with the least congested route, and/or any other distance measure.

The first type refers to anycasting a public IP address towards end users 120. The scrubbing centers 140 advertise the public IP address used to represent the protected server 170 from all scrubbing centers 140 simultaneously using anycasting. Traffic from users throughout the world is sent to scrubbing centers 140 that are closest to them, ensuring minimum latency. Moreover if a scrubbing center 140 goes down it will stop advertising these addresses so traffic is sent to the next closest one, ensuring almost unlimited redundancy across the entire network.

The second type refers to anycasting the scrubbing center's 140 public IP address towards the protected server's 170 origin. The scrubbing centers 140 advertise the public IP address of the virtual GRE tunnel from all scrubbing centers 140 simultaneously using anycasting. This public IP address may be the same or different from the one anycasted to end users. Traffic from the protected server origin 170 is sent to the scrubbing center 140 that is closest to it ensuring minimum latency. Moreover if this scrubbing center 140 goes down it will stop advertising these addresses so traffic is sent to the next closest one, ensuring almost unlimited redundancy across the entire network.

Figure 3:
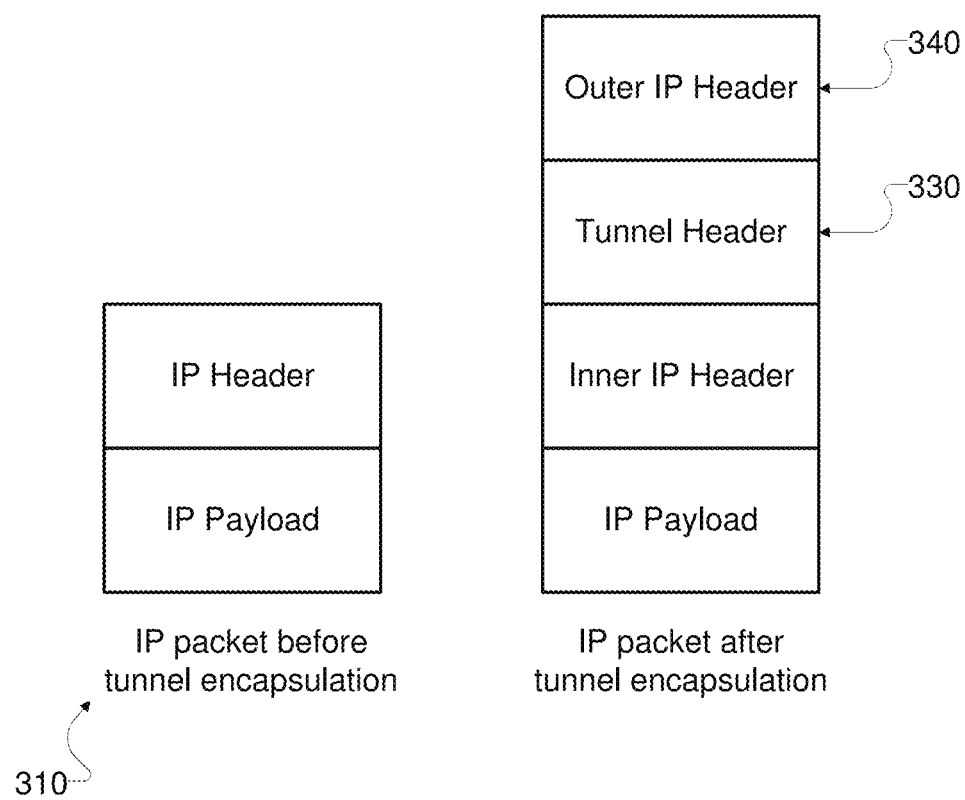
FIG. 3 illustrates an IP packet before adding a GRE header and after adding a GRE header, according to one embodiment.

FIG. 3 illustrates an IP packet before adding a GRE header and after adding a GRE header, according to one embodiment. Before the GRE tunnel encapsulation, the IP packet 310 includes an IP header and an IP payload. The GRE tunnel is established to route the packet to the protected server and to protect the packet from DDoS attacks when it is routed. A tunnel header 330 and an outer IP header 340 are added to the IP packet to encapsulate the IP packet. The outer IP header includes a source IP address which is an anycast address of the scrubbing server and a destination IP address which is the secret IP address established between the protected server and the DDoS protection module 140. The secret IP address does not appear on record as belonging to the organization's network.

Using the examples from FIGS. 1 and 5, if the end user 120 source IP address is 1.1.1.1, and it's original destination address is 1.1.1.2, this information would be included in the original IP packet before encapsulation (310). Then, when the scrubbing center 140 sends the packet to the protected server 170, it adds (330, 340) a spoofed source (3.3.3.3, the scrubbing center anycast address from the protected server's perspective) and destination address (1.2.3.4, the true/private IP address of the protected server 170). Likewise, on the outbound packet from the protected server 170, the encapsulation headers (330, 340) would show the source IP address as the protected server (1.2.3.4; private, known to the scrubbing center) and destination IP address as the spoofed scrubbing center anycast address (3.3.3.3). The encapsulation would be removed at the scrubbing center 140 to ensure that the packet gets back to its original sourced, the end user (1.1.1.1).

Figure 4:
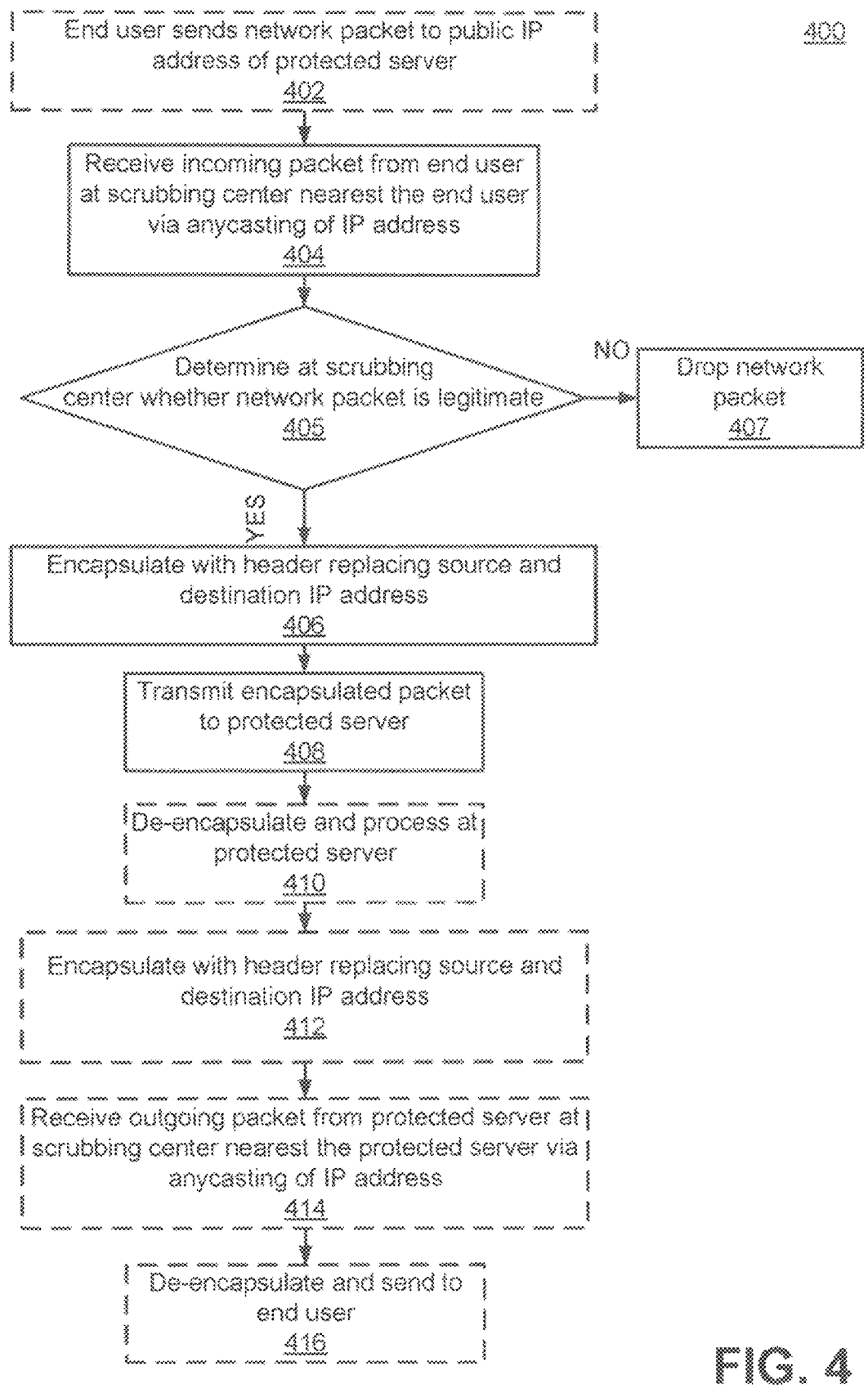
FIG. 4 illustrates a flow of events that occur when an end user accesses an organization's network, according to one embodiment.

FIG. 4 illustrates a flow of events 400 that occur when an end user 120 accesses an organization's network 160, according to one embodiment. In this example, the organization has performed infrastructure onboarding, e.g., as described in conjunction with FIG. 2. As an initial step, an end user 120 sends 402 a network packet to a destination address that is the public IP address associated with a protected server 170. For example, the end user 120 may look up the IP address of the protected network using a name service. No public records exist that associate the protected network with the private IP address used between the scrubbing server 140 and the protected network 160. The incoming network packet is received 404 from the end user 120 at the scrubbing center 140 nearest the end user 120, despite the incoming network packet being intended for a protected server, e.g., 170, of a network organization, e.g., 160, identified using the public IP address, as the public IP address serves as an anycast address for a plurality of scrubbing centers 140 in a distributed network of scrubbing servers, the plurality of scrubbing servers 140 including the scrubbing center 140 nearest the end user 120. The incoming network packet includes the public IP address as the source of the incoming packet such that the protected server 170 does not know which scrubbing center 140 sent the incoming network packet. The scrubbing center "nearest" the end user or protected serer can be geographically closest, lowest cost, healthiest, with the least congested route, or any other distance measure.

The scrubbing center 140 receives and processes the incoming network packet traffic to filter out illegitimate traffic (for example, a DDoS attack type of traffic). The scrubbing center 140 nearest the end user 120 determines 405 whether the incoming network packet is legitimate. Traffic that is considered illegitimate or malicious is dropped 407 by the scrubbing center 140 and thus never reaches the protected network 160.

Responsive to the scrubbing center 140 determining that the incoming network packet is legitimate, it encapsulates 406 the incoming network packet with header information including a destination address including a private IP address for the protected server 170. This private IP address unknown to the end user 120, and is kept secret between the scrubbing enter 140 and the protected server 170. For example, the encapsulation used is GRE according to one embodiment.

Then the encapsulated incoming network packet is transmitted 408 to the protected server 170 at the private IP address based on the header information, e.g., via a GRE tunnel.

The incoming packet is received at the organization's network infrastructure 160 according to one embodiment. The original network packet information is decapsulated 410, extracted, processed, and routed to the appropriate protected server 170 in the protected network 160. The packet is routed as if it was sent by the end user 120 to the organization's network infrastructure 160 directly. This process maintains the actual client IP information and allows the organization 160 to detect its actual source of the traffic.

With respect to outgoing network traffic, the organization's network infrastructure 160 handles egress packets destined for the end user 120 (they can be detected by their source which is maintained throughout this process) as follows. The same encapsulation techniques, e.g., a GRE tunnel, is configured on one of the organization's network infrastructure 160 interfaces so that packets being sent back to the end users 120 are encapsulated with a GRE header in order to go through the GRE tunnel back to the routing servers. These packages are destined for the scrubbing centers 140 anycast public IP address that is advertised by the routing servers. Specifically, an outgoing network packet is encapsulated 412 by the protected server 170 or network organization 160 with header information including the anycast public IP address of the scrubbing servers 140. The encapsulated packet is routed through the Internet to the scrubbing center 140 nearest the protected server 170 sending it, since the IP address of the scrubbing center 140 interface is advertised as anycast. For example, in some circumstances the scrubbing center 140 nearest the end user 120 and the scrubbing center 140 nearest the protected server 170 are different scrubbing centers 140.

The scrubbing center 140 receives 414 the outgoing network packet (e.g., including any GRE tunnel information). The scrubbing center 140 nearest the protected server 170 then decapsulates 416 the outgoing network packet such that the destination address is the end user 120, and transmits the packet to the end user 120.

FIG. 5 illustrates an example of incoming and outgoing traffic from/to an end user 120 and a protected server 170, via scrubbing servers 140 of a DDoS protection module, according to one embodiment.

In the illustrated example, incoming traffic 505 from an end user 120 with a source (end user) IP address (1.1.1.1) attempts to contact protected server 170 an organization's network infrastructure 160 in Los Angeles, via a destination address that is the advertised public IP address for the server 170 (1.1.1.2). Three scrubbing centers 140a-c are shown, which can receive and process the incoming traffic from the end user 120, in Amsterdam 140a, Frankfurt 140b, and Los Angeles 140c. The advertised public IP address (1.1.1.2) serves as an anycast address for the scrubbing centers 140 rather than the true IP address of the protected server 170, which his kept secret between the scrubbing centers 140 and the protected server 170. Thus, traffic directed to the public IP address (1.1.1.2) for protected server 170 instead is directed to the scrubbing center 140 nearest the end user 120.

If the end user 120 is in Amsterdam, for example, the nearest scrubbing center 140 is in Amsterdam, 140a, so it receives the traffic 505 from end user 120 intended for protected server 170 via the anycast IP address. Header information is added, e.g., by use of a GRE tunnel 150 between the scrubbing centers 140 and the protected server 170. The header information replaces the destination address (the public IP address, 1.1.1.2) with the true, private IP address of the protected server (1.2.3.4), so that the traffic is delivered 510 to the protected server 170, once it has been verified by the scrubbing center 140a as legitimate. It also replaces the source address of the end user 120 (1.1.1.1) with a spoofed source IP address (3.3.3.3) that is an anycast address for the scrubbing servers 140 from the protected server 170 perspective.

In the illustrated example, outgoing traffic from the protected server 170 of the organization's network 160 to the end user 120 also is routed via the scrubbing centers 140 of the DDoS protection module, according to one embodiment. Continuing the example from above, when the Los Angeles protected server 170 receives the network packet, it will decapsulate its header and process it. When it sends back an outgoing response 515 intended for the end user's 120 IP address (1.1.1.1), it goes through the spoofed anycast IP address (3.3.3.3), and thus the outgoing traffic will be routed via the scrubbing center 140 nearest the protected server 170, scrubbing center 140c. The protected server 170 uses the true source IP address (the private, protected server address 1.2.3.4) as the source IP address, since it is known to the scrubbing center 140. The outgoing traffic eventually reaches 520 the end user 120 in Amsterdam, but this time via the Los Angeles scrubbing center 140c. At the scrubbing center 140, the header is removed so that the original source IP address (the end user address, 1.1.1.1) is revealed and the packet is correctly routed back.

The GRE tunnel can serve more than one protected IP address in some embodiments, for example in case the customer router is serving two different IP addresses, which are protected by two unique private IP addresses, a single GRE tunnel for these two different IP addresses can be used.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Any of the devices or systems described herein can be implemented by one or more computing devices. A computing device can include a processor, a memory, a storage device, an I/O interface, and a communication interface, which may be communicatively coupled by way of communication infrastructure. Additional or alternative components may be used in other embodiments. In particular embodiments, a processor includes hardware for executing computer program instructions by retrieving the instructions from an internal register, an internal cache, or other memory or storage device, and decoding and executing them. The memory can be used for storing data or instructions for execution by the processor. The memory can be any suitable storage mechanism, such as RAM, ROM, flash memory, solid state memory, and the like. The storage device can store data or computer instructions, and can include a hard disk drive, flash memory, an optical disc, or any other suitable storage device. The I/O interface allows a user to interact with the computing device, and can include a mouse, keypad, keyboard, touch screen interface, and the like. The communication interface can include hardware, software, or a combination of both, and can provide one or more interfaces for communication with other devices or entities.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A method of providing infrastructure protection for a protected server of a network organization, the method comprising:
    receiving, by a processor, an encapsulated outgoing network packet from the protected server, wherein the encapsulated outgoing network packet is an outgoing network packet which has been encapsulated by the protected server with header information comprising an anycast address for a scrubbing center network, wherein the anycast address acts as a spoof destination address of the outgoing network packet directed to a first scrubbing center of the scrubbing center network nearest to the protected server and is provided by the scrubbing center network as a spoof source address of incoming network packets directed to the protected server, wherein the incoming network packets are from a second scrubbing center of the scrubbing center network nearest to an end user system, wherein the scrubbing center network corresponds to a plurality of scrubbing centers that includes the first scrubbing center and the second scrubbing center, and wherein the protected server is one of a plurality of protected servers in the network organization;
    decapsulating, by the processor, the outgoing network packet to generate a decapsulated outgoing network packet by removing the encapsulation added by the protected server that includes the header information; and
    transmitting the decapsulated outgoing network packet to the end user system.

2. The method of claim 1, wherein the anycast address is an internet protocol (IP) address.

3. The method of claim 1, wherein the decapsulating is performed by the processor at the first scrubbing center nearest to the protected server.

4. The method of claim 1, wherein the encapsulated outgoing network packet is received at the scrubbing center network and routed to the end user system.

5. The method of claim 1, wherein the header information comprises generic routing encapsulation tunnel information.

6. The method of claim 5, wherein the generic routing encapsulation tunnel information comprises use of a single, virtual generic routing encapsulation tunnel.

7. The method of claim 6, wherein the single, virtual generic routing encapsulation tunnel can serve the plurality of protected servers in the network organization.

8. The method of claim 1, wherein the second scrubbing center nearest to the end user system comprises one selected from the group consisting of geographically closest, lowest cost, healthiest, with the least congested route, and another distance measure.

9. A non-transitory computer readable storage medium having instructions encoded thereon that, when executed by a processor, cause the processor to:
    receive an encapsulated outgoing network packet from a protected server of a network organization, wherein the encapsulated outgoing network packet is an outgoing network packet which has been encapsulated by the protected server with header information comprising an anycast address for a scrubbing center network, wherein the anycast address acts as a spoof destination address of the outgoing network packet directed to a first scrubbing center of the scrubbing center network nearest to the protected server and is provided by the scrubbing center network as a spoof source address of incoming network packets directed to the protected server, wherein the incoming network packets are from a second scrubbing center of the scrubbing center network nearest to an end user system, wherein the scrubbing center network corresponds to a plurality of scrubbing centers that includes the first scrubbing center and the second scrubbing center, and wherein the protected server is one of a plurality of protected servers in the network organization;
    decapsulate the outgoing network packet to generate a decapsulated outgoing network packet by removing the encapsulation added by the protected server that includes the header information; and
    transmit the decapsulated outgoing network packet to the end user system.

10. The non-transitory computer readable storage medium of claim 9, wherein the anycast address is an internet protocol (IP) address.

11. The non-transitory computer readable storage medium of claim 9, wherein the decapsulating is performed by the processor at the first scrubbing center nearest to the protected server.

12. The non-transitory computer readable storage medium of claim 9, wherein the encapsulated outgoing network packet is received at the scrubbing center network and routed to the end user system.

13. The non-transitory computer readable storage medium of claim 9, wherein the header information comprises generic routing encapsulation tunnel information.

14. The non-transitory computer readable storage medium of claim 13, wherein the generic routing encapsulation tunnel information comprises use of a single, virtual generic routing encapsulation tunnel.

15. The non-transitory computer readable storage medium of claim 14, wherein the single, virtual generic routing encapsulation tunnel can serve the plurality of protected servers in the network organization.

16. The non-transitory computer readable storage medium of claim 9, wherein the second scrubbing center nearest to the end user system comprises one selected from the group consisting of geographically closest, lowest cost, healthiest, with the least congested route, and another distance measure.

17. An apparatus, comprising:
a processor to:
establish a single, virtual generic routing encapsulation (GRE) tunnel between a first distributed denial of service (DDoS) protection device and a target network using a dedicated internet protocol (IP) address of the target network, wherein the first DDoS protection device is nearest to a protected server of the target network, wherein the dedicated IP address is kept secret between the first DDoS protection device and the target network;
receive, through the single, virtual GRE tunnel, an encapsulated outgoing network packet from the protected server of the target network, wherein the encapsulated outgoing network packet is an outgoing network packet which has been encapsulated by the protected server with header information comprising an anycast address for a scrubbing center network that corresponds to a plurality of DDoS protection devices including the first DDoS protection device nearest to the protected server and a second DDoS protection device nearest to an end user system, wherein the anycast address acts as a spoof destination address of the outgoing network packet directed to the first DDoS protection device of the scrubbing center network nearest to the protected server and is provided by the scrubbing center network as a spoof source address of incoming network packets directed to the protected server, wherein the incoming network packets are from the second DDoS protection device of the scrubbing center network nearest to the end user system, and wherein the protected server is one of a plurality of protected servers in the target network;
decapsulate the outgoing network packet to generate a decapsulated outgoing network packet by removing the encapsulation added by the protected server that includes the header information; and
transmit the decapsulated outgoing network packet to the end user system.

18. The apparatus of claim 17, wherein the GRE tunnel is configured to serve the plurality of protected servers in the target network.

* * * * *